United States Patent
Boettger et al.

(10) Patent No.: US 11,650,170 B2
(45) Date of Patent: May 16, 2023

(54) METHOD FOR DETECTING A CRITICAL DEFECT IN A CERAMIC ROLLING ELEMENT

(71) Applicants: Aktiebolaget SKF, Gothenburg (SE); SKF Aerospace France S.A.S, Montigny-le-Bretonneux (FR)

(72) Inventors: Paul Heinrich Michael Boettger, Linz (AT); Victor Brizmer, Utrecht (NL); Herve Carrerot, Vicq (FR); Yoann Hebrard, Sarras (FR); Charlotte Vieillard, Woerden (NL)

(73) Assignees: Aktiebolaget SKF, Gothenburg (SE); SKF Aerospace France S.A.S., Montigny-le-Bretonneux (FR)

( * ) Notice: Subject to any disclaimer, the term of this patent is extended or adjusted under 35 U.S.C. 154(b) by 95 days.

(21) Appl. No.: 17/306,024

(22) Filed: May 3, 2021

(65) Prior Publication Data
US 2021/0396686 A1    Dec. 23, 2021

(30) Foreign Application Priority Data

Jun. 18, 2020 (FR) ...................................... 2006367

(51) Int. Cl.
*G01N 23/04* (2018.01)
*G01N 23/18* (2018.01)
(Continued)

(52) U.S. Cl.
CPC ............ *G01N 23/18* (2013.01); *G01M 13/04* (2013.01); *G01N 23/04* (2013.01); *G01N 23/043* (2013.01);
(Continued)

(58) Field of Classification Search
CPC .... G01N 23/04; G01N 23/043; G01N 23/046; G01N 23/18; G01N 2223/1016;
(Continued)

(56) References Cited

U.S. PATENT DOCUMENTS

| 5,182,775 A * | 1/1993 | Matsui | G06T 7/0004 |
| | | | 706/912 |
| 6,873,680 B2 * | 3/2005 | Jones | G01N 23/083 |
| | | | 382/152 |

(Continued)

FOREIGN PATENT DOCUMENTS

| DE | 102010056042 A1 | 6/2012 |
| EP | 2749871 A1 | 7/2014 |

(Continued)

OTHER PUBLICATIONS

Ceng Beng et al: "Rolling Contact Fatigue 1-10 of Ceramics by Mark Hadfield", Jan. 1, 1993 (Jan. 1, 1993), XP055783715, Extra it de l 'Internet: URL:https://core.ac.uk/download/pdf/963316 9.pdf [extrait le Mar. 9, 2021] * abrege * * para. 4.3.4, 4.4.1; pp. 60-63 *.

*Primary Examiner* — Allen C. Ho
(74) *Attorney, Agent, or Firm* — Garcia-Zamor Intellectual Property Law, LLC; Ruy Garcia-Zamor

(57) ABSTRACT

Method for detecting at least one critical defect in a ceramic rolling element providing the steps of capturing a plurality of two-dimensional digital radiographic images of the ceramic rolling element; digitally filtering each radiographic image; delineating, on the basis of the filtered image, at least one region liable to comprise the critical defect; constructing stereoscopically a virtual model of the ceramic rolling element having the region; comparing the dimensions of the delineated region with a plurality of predetermined threshold (Continued)

values, and, when the dimensions are greater than the threshold values, generating an alarm signal.

10 Claims, 2 Drawing Sheets

(51) Int. Cl.
  *G01M 13/04* (2019.01)
  *G01N 23/046* (2018.01)
(52) U.S. Cl.
  CPC ... *G01N 23/046* (2013.01); *G01N 2223/1016* (2013.01); *G01N 2223/414* (2013.01); *G01N 2223/646* (2013.01)
(58) Field of Classification Search
  CPC ....... G01N 2223/414; G01N 2223/646; G01N 2223/6462; G01N 2223/6466
  USPC .................. 378/41, 42, 58, 53, 54
  See application file for complete search history.

(56) References Cited

U.S. PATENT DOCUMENTS

| | | | | |
|---|---|---|---|---|
| 7,564,944 B2 * | 7/2009 | Kato | ............... | G01N 23/046 |
| | | | | 378/58 |
| 7,852,982 B2 * | 12/2010 | Saito | ............... | G01N 23/223 |
| | | | | 378/58 |
| 8,204,291 B2 * | 6/2012 | Venkatachalam | .... | G06V 10/993 |
| | | | | 378/58 |
| 10,048,214 B2 * | 8/2018 | Tanaka | ............... | G01M 13/04 |
| 10,697,905 B2 * | 6/2020 | Featonby | ......... | G01N 23/20066 |
| 11,047,806 B2 * | 6/2021 | Bhattacharyya | ....... | G01N 23/04 |
| 11,493,334 B2 * | 11/2022 | Cosneau | ............... | G01B 15/02 |
| 11,493,459 B2 * | 11/2022 | Sugihara | ............ | G01N 33/442 |

FOREIGN PATENT DOCUMENTS

| | | |
|---|---|---|
| JP | 2003042975 A | 2/2003 |
| JP | 2005351875 A | 12/2005 |
| WO | 2018/014138 A1 | 1/2018 |
| WO | 2018/215449 A1 | 11/2018 |

* cited by examiner

[Fig.1]
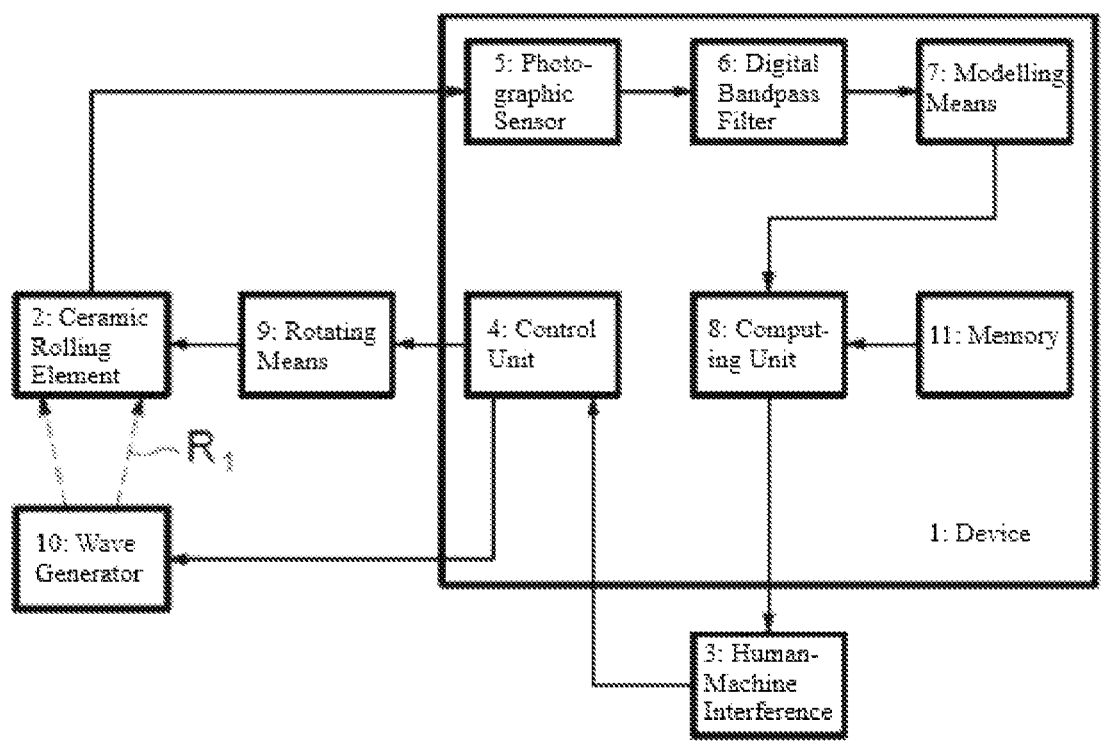

[Fig.2]
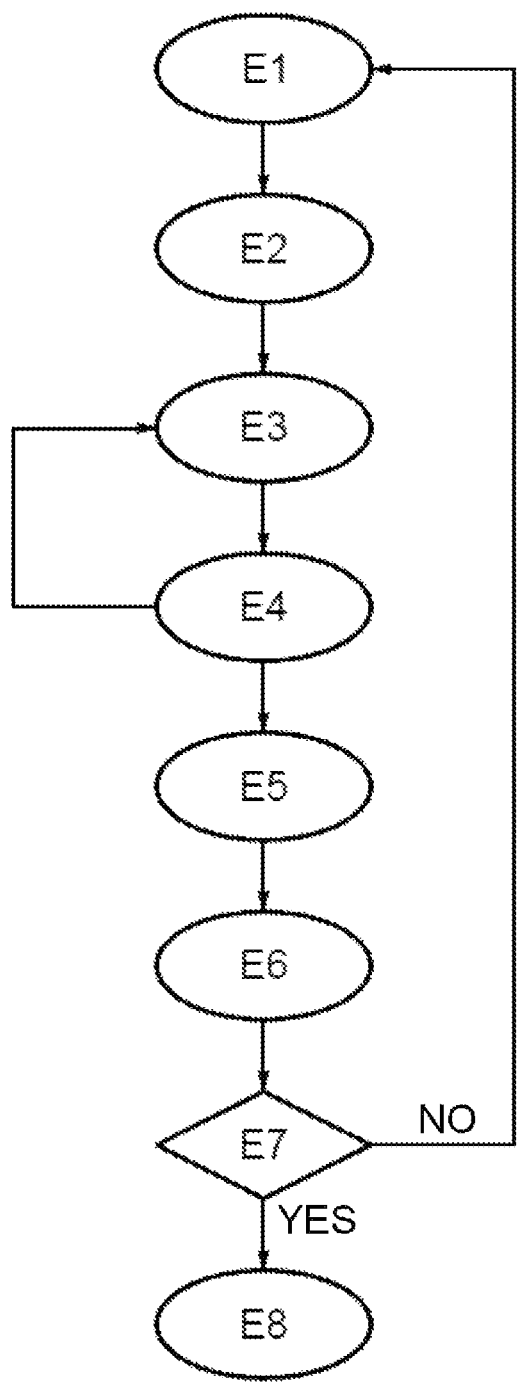

METHOD FOR DETECTING A CRITICAL DEFECT IN A CERAMIC ROLLING ELEMENT

CROSS-REFERENCE TO RELATED APPLICATIONS

This application claims the benefit of French Patent Application 2006367, filed Jun. 18, 2020, the contents of which is fully incorporated herein by reference.

TECHNICAL FIELD OF THE INVENTION

The present invention relates to ceramic rolling elements, and more particularly relates to the detection of manufacturing defects in such rolling elements.

PRIOR ART

In order to guide a mechanical assembly in rotation, it is generally proposed to use rolling bearings equipped with rolling elements made of ceramic or of steel. The rolling elements may for example be balls or even cylindrical, conical or spherical rollers.

These rolling elements of rolling bearings allow a circular movement of a shaft with respect to a fixed element to be ensured while limiting frictional force.

They are applicable to reversible electric motors or combustion engines, both in the automotive and in the aeronautical field.

However, as ceramic rolling elements are produced by sintering, they may contain inclusions of foreign material, nonuniform agglomerations of material, or porosities.

These defects are liable to make the rolling elements fail and therefore to damage the product comprising the rolling bearing equipped with such rolling elements.

For example, when the rolling bearing equipped with failed rolling elements is located on a rotating shaft, they may cause spalling and/or overheating and the shaft will rotate with increasing difficulty.

Moreover, the rolling elements are liable to completely disunite from the other components of the bearing and thus cause the rotating shaft to disassociate from its surrounding mechanical system: this may prove to be critical in aeronautics.

Thus, to prevent failure of a rolling element, it is advantageous to detect these defects from the moment of its manufacture and to evaluate their criticality depending on the field of application of the rolling element and on the characteristics of the detected defect.

To do this, it is known to use an optical device configured to reflect light from the surface of a rolling element and to detect defects located solely on its surface.

It is furthermore known to propagate ultrasound through rolling elements in order to reveal the internal defects of the rolling element.

However, the propagation of ultrasound is subject to constraints related to the profile of the rolling element.

More precisely, the more curved the contours of the rolling element, the more the ultrasound is reflected in undesirable directions causing information to be lost.

Another solution consists in using imaging involving projection of high-frequency electromagnetic waves such as x-rays, as described in European patent application EP2749871A1.

More particularly, it is a question of directing a beam of x-rays from a radiation source to the rolling element, then in generating an image able to allow the detection of a defect inside and on the surface of the rolling element.

However, this solution does not propose to discriminate between defects considered to be critical and defects having no incidence on the operation of the rolling element.

In light of the above, the invention proposes to mitigate the aforementioned constraints by providing a method for detecting at least one critical defect inside and on the surface of a rolling element.

SUMMARY OF THE INVENTION

One subject of the invention is therefore a method for detecting at least one critical defect in a ceramic rolling element, this method comprising:

capturing a two-dimensional digital radiographic image of the rolling element;

digitally filtering the radiographic image;

delineating, on the basis of the filtered image, at least one region liable to comprise the critical defect;

constructing stereoscopically a virtual model of the rolling element comprising the region;

comparing the dimensions of the delineated region with a plurality of predetermined threshold values, and, when the dimensions are greater than the threshold values, generating an alarm signal.

It is here a question of detecting a critical defect in a rolling element made of a ceramic such as silicon nitride (formula $Si_3N_4$), SiAlON or an alloy of alumina and zirconium oxide.

To this end, an imaging technique involving high-frequency electromagnetic waves is used.

Traversing high-frequency electromagnetic waves are projected onto a plane intended to reconstruct a two-dimensional radiographic image of the rolling element at a defined degree of rotation.

Each image is then filtered in order to uniformly distribute the noise present in the image and thus facilitate the delineation of the outline of the rolling element and, subsequently, that of the regions liable to contain at least one critical defect.

To determine the dimensions of the defect and to compare it to a plurality of threshold values, the defect is located in a stereoscopic model of the rolling element.

Thus, when the dimensions of the defect are greater than the threshold values, the defect is considered to be critical.

Preferably, the method comprises capturing a plurality of two-dimensional digital radiographic images of the rolling element, digitally filtering each radiographic image and delineating, on the basis of each filtered image, at least one region liable to comprise the critical defect.

Advantageously, the digital filtering is carried out using a bandpass filter that is able to filter an image comprising 5 to 2000 pixels and greyscale levels between 256 and 4 million.

Preferably, the threshold values are determined depending on the field of application of the rolling element, on the nature of the defect and on the location of the region in the rolling element.

For example, when it is a question of a rolling element intended for aeronautical applications, it is advantageous for the threshold values to allow it to be determined whether the detected default is considered to be critical as defined in ASME (for American Society of Mechanical Engineers) international certification and more particular in standard E19-15.

More precisely, these certifications define criticality especially depending on the nature of the detected defect and on its location in the rolling element.

Preferably, the region liable to comprise the critical defect is delineated depending on the colour-intensity level of the filtered image.

The threshold value allowing the image to be segmented is comprised between 80 and 150 for a greyscale of 256 levels.

Advantageously, the threshold values are determined depending on the dimensions and on the pressure of the contact between the rolling element and the raceway, on the depth of the defect and on its physical and mechanical characteristics.

The threshold values may furthermore be determined depending on the material of the defect.

Another subject of the invention is a device for detecting at least one critical defect in a ceramic rolling element, this method comprising:

a photographic sensor configured to capture a two-dimensional digital radiographic image of the rolling element;

a digital filter configured to filter the radiographic image;

modelling means configured to delineate, on the basis of the filtered image, at least one region liable to comprise the critical defect, and to construct a stereoscopic image of a virtual model of the rolling element comprising the region;

a computing unit configured to compare the dimensions of the delineated region with a plurality of predetermined threshold values, and to generate an alarm signal when the dimensions are greater than the threshold values.

It will be noted that the photographic sensor may be a CCD camera.

As for the computing unit and the modelling means, they may be implemented in the form of modules able to execute program instructions and to exchange data with other devices.

Mention may be made, for example, of a microcontroller or a microprocessor.

The computing unit and the modelling means may also be implemented in the form of logic circuits in a partially or entirely hardware implementation.

Preferably, the photographic sensor is configured to capture a plurality of two-dimensional digital radiographic images of the rolling element, the digital filter is configured to filter each radiographic image, and wherein the modelling means are configured to delineate, on the basis of the filtered image, at least one region liable to comprise the critical defect.

Preferably, the threshold values are determined depending on the field of application of the rolling element, the nature of the defect, the location of the region in the rolling element and/or depending on the dimensions and on the pressure of contact between the rolling element and the raceway, on the depth of the defect and on its physical and mechanical characteristics.

Preferably, the modelling means are configured to delineate the region liable to comprise the critical defect depending on the colour-intensity level of the filtered image.

BRIEF DESCRIPTION OF THE FIGURES

Further aims, features and advantages of the invention will become apparent from reading the following description, which is given purely by way of nonlimiting example and with reference to the appended drawings, in which:

FIG. 1 schematically illustrates the modules of a device for detecting at least one critical defect in a ceramic rolling element according to one embodiment of the invention; and, FIG. 2 shows a flowchart of a method for detecting the critical defect, implemented by the device, according to one mode of implementation of the invention.

DETAILED DESCRIPTION OF THE INVENTION

FIG. 1 shows a device 1 for detecting at least one critical defect in a ceramic rolling element 2.

To do this, the device 1 is coupled to a human-machine interface 3 that is configured to graphically represent data received by the device 1.

The human-machine interface 3 is furthermore configured to transmit instructions to the device 1, which instructions are formulated by an operator or a hardware architecture external to the device 1.

More particularly, the device 1 comprises a control unit 4, a photographic sensor 5, a digital bandpass filter 6, modelling means 7 and a computing unit 8.

The control unit 4 is coupled to the human-machine interface 3 and is configured to translate the instructions formulated by the human-machine interference 3 into setpoint signals.

The control unit 4 is furthermore coupled to rotating means 9 and to a generator 10 of high-frequency electromagnetic waves R1.

More precisely, the control unit 4 is able to deliver a setpoint signal to the rotating means 9 so as to orient the rotating ceramic rolling element 2 with a predetermined degree of rotation.

As for the generator 10, it is configured to emit, when it receives a setpoint signal from the control unit 4, the electromagnetic waves R1 toward the ceramic rolling element 2.

These electromagnetic waves R1 are subsequently absorbed by the photographic sensor 5.

By way of example, the photographic sensor 5 comprises a plurality of pixels, and the dynamic range of the greyscale levels of the sensor is equal to 256.

A two-dimensional digital radiographic image is thus formed of the ceramic rolling element 2, the image being taken at the defined degree of rotation.

It will be noted that the generator 10 generally takes the form of a microfocus x-ray tube.

The radiographic two-dimensional image thus formed is then processed by the digital bandpass filter 6 so as to uniformly distribute the noise present in the image, and thus to facilitate the delineation of the outline of the ceramic rolling element 2.

The digital bandpass filter 6 is moreover coupled to the modelling means 7, which are configured to construct, via erosion or via stereoscopic reconstruction, a stereoscopic image of a virtual model of the ceramic rolling element 2.

The virtual model comprises the detected defect liable to be considered as critical.

To construct the model, the modelling means 7 are coupled to the computing unit 8 so as to deliver thereto data relative to the stereoscopic image.

More precisely, the computing unit 8 is able to compare the dimensions of the detected defect with a plurality of predetermined threshold values contained in a memory 11 of the device 1.

These threshold values are determined depending on the field of application of the ceramic rolling element 2, on the nature of the detected defect and on its location within the stereoscopic image representing the ceramic rolling element 2.

Thus, when the dimensions of the detected defect are greater than the threshold values, the control unit 8 is configured to generate an alarm signal and to deliver it to the human-machine interface 3.

Reference is now made to FIG. 2, which illustrates a flowchart of a method for detecting at least one critical defect in the rolling element 2, which method is implemented by the device 1.

The method starts with a step E1 in which an operator positions a rolling element 2 so that it is able to be passed through by the x-ray electromagnetic waves R1 of the generator 10.

In step E2, the operator requests activation of the device 1 using the human-machine interface 3. An activation signal is thus delivered to the control unit 4 by the human-machine interface 3.

In step E3, the control unit 4 orients the rotating means 9 with a determined degree, for example 60°, and activates the generation of electromagnetic waves R1 by the generator 10.

In step E4, a first image is thus acquired by the photographic sensor 5.

To increase the precision and limit the remanence of the sensor 5, the latter is supplied with a low current, for example one of a magnitude lower than 10 to 250 kV.

Moreover, in order to decrease the risk of saturation of the photographic sensor 5, it is advantageous for the exposure time of the rolling element 2 to the x-ray electromagnetic waves R1 to be comprised between 100 milliseconds and 6 seconds.

It will be noted that it is advantageous to capture at least two new images of the rolling element 3 at other degrees of rotation, for example 0° and −60°, in order to be able to optimally detect a defect in the rolling element 2.

More particularly, the number of images mainly depends on the dimensions of the rolling element 2 and on the geometry of the photographic sensor 5.

By way of example, when the rolling element 2 has a diameter equal to 25.4 mm, it is advantageous to capture eight images. In this case, the method repeats steps E3 and E4 at least seven times.

However, it is possible to capture a single image when the rolling element 2 has a diameter smaller than 12.7 mm.

In step E5, the bandpass digital filter 6 filters each captured image in order to decrease the noise present in the image while preserving high variations in greyscale level, this allowing the presence of a defect to be detected.

In step E6, each filtered image is then processed by the modelling means 7.

More precisely, the modelling means 7 subtract the filtered image from the initial radiographic image, this having as result the construction of a second image on the basis of which the modelling means 7 are configured to draw the outline of the rolling element 2.

To this end, the modelling means 7 solely preserve the greyscale levels of the image that are less than a threshold value comprised between 80 and 150 for a greyscale of 256 levels.

Next, the modelling means 7 delineate at least one region liable to comprise a critical defect and localize it in a stereoscopic virtual model of the rolling element 2.

To do this, the modelling means 7 implement a stereoscopic reconstruction or erosion method.

More precisely, the modelling means 7 implement a method for binarizing the image.

Next, the modelling means 7 construct a stereoscopic image of a virtual model of the rolling element 2 on the basis of the plurality of captured and processed images.

In step E7, the computing unit 8 compares the dimensions of the delineated region with a plurality of predetermined threshold values, and when the dimensions are greater than the threshold values, the computing unit 8 delivers, in step E8, an alarm signal to the human-machine interface 3.

In other words, the rolling element 2 comprises a critical defect liable to damage it and/or the mechanisms to which it is coupled.

In the contrary case, when the rolling element 2 does not comprise any critical defect, the method returns to step E1 in order to detect the presence of a critical defect in another rolling element 2.

By virtue of the invention, it is possible to detect a critical defect inside and on the surface of the rolling element, and thus to increase the reliability of operation of the associated rolling bearing.

The invention claimed is:

1. A method for detecting at least one critical defect in a ceramic rolling element, comprising:
    capturing at least one two-dimensional digital radiographic image of the ceramic rolling element;
    digitally filtering the at least one two-dimensional digital radiographic image;
    delineating, on a basis of the at least one digitally filtered two-dimensional digital radiographic image, at least one region liable to comprise the at least one critical defect in the ceramic rolling element;
    constructing stereoscopically a virtual model of the ceramic rolling element comprising the at least one region;
    comparing dimensions of the at least one delineated region with a plurality of predetermined threshold values, and
    generating an alarm signal when the dimensions are greater than the plurality of predetermined threshold values.

2. The method according to claim 1, further comprising:
    capturing a plurality of two-dimensional digital radiographic images of the ceramic rolling element;
    digitally filtering each two-dimensional digital radiographic image; and
    delineating, on a basis of each digitally filtered two-dimensional digital radiographic image, at least one region liable to comprise the at least one critical defect in the ceramic rolling element.

3. The method according to claim 1, wherein the digitally filtering the at least one two-dimensional radiographic image comprises using a digital bandpass filter that is able to digitally filter an image comprising 5 to 2000 pixels and greyscale levels between 256 and 5 million.

4. The method according to claim 1, wherein the plurality of predetermined threshold values are determined depending on a field of application of the ceramic rolling element, on a nature of the at least one critical defect and on a location of the at least one region in the ceramic rolling element.

5. The method according to claim 1, wherein the at least one region liable to comprise the at least one critical defect in the ceramic rolling element is delineated depending on a colour-intensity level of the at least one digitally filtered two-dimensional digital radiographic image.

6. The method according to claim 1, wherein the plurality of predetermined threshold values are determined depending on the dimensions and on a pressure of a contact between the ceramic rolling element and a raceway, on a depth of the at least one critical defect in the ceramic rolling element, and on physical and mechanical characteristics of the ceramic rolling element.

7. A device for detecting at least one critical defect in a ceramic rolling element, comprising:
 a photographic sensor that is configured to capture a two-dimensional digital radiographic image of the ceramic rolling element;
 a digital filter configured to filter the two-dimensional digital radiographic image;
 modelling means configured to delineate, on a basis of the filtered two-dimensional digital radiographic image, at least one region liable to comprise the at least one critical defect in the ceramic rolling element, and to construct a stereoscopic image of a virtual model of the ceramic rolling element comprising the at least one region; and
 a computing unit configured to compare dimensions of the at least one delineated region with a plurality of predetermined threshold values, and to generate an alarm signal when the dimensions are greater than the threshold values.

8. The device according to claim 7, wherein the photographic sensor is configured to capture a plurality of two-dimensional digital radiographic images of the ceramic rolling element, the digital filter is configured to filter each two-dimensional digital radiographic image, and wherein the modelling means are configured to delineate, on a basis of each filtered two-dimensional digital radiographic image, at least one region liable to comprise the at least one critical defect in the ceramic rolling element.

9. The device according to claim 7, wherein the plurality of predetermined threshold values are determined depending on a field of application of the ceramic rolling element, a nature of the at least one critical defect in the ceramic rolling element, on a location of the at least one region in the ceramic rolling element and/or depending on the dimensions and on a pressure of a contact between the ceramic rolling element and a raceway, on a depth of the at least one critical defect in the ceramic rolling element, and on physical and mechanical characteristics of the ceramic rolling element.

10. The device according to claim 7, wherein the modelling means are configured to delineate the at least one region liable to comprise the at least one critical defect in the ceramic rolling element depending on a colour-intensity level of the filtered two-dimensional digital radiographic image.

* * * * *